United States Patent
Sugimoto

(10) Patent No.: US 7,956,580 B2
(45) Date of Patent: Jun. 7, 2011

(54) CELL SET CAPACITY CONTROLLING SYSTEM AND METHOD

(75) Inventor: Tomonaga Sugimoto, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 67 days.

(21) Appl. No.: 11/217,681

(22) Filed: Sep. 2, 2005

(65) Prior Publication Data

US 2006/0043934 A1 Mar. 2, 2006

(30) Foreign Application Priority Data

Sep. 2, 2004 (JP) .................. 2004-255759

(51) Int. Cl.
*H02J 7/00* (2006.01)
(52) U.S. Cl. .................. 320/132; 320/136; 320/149
(58) Field of Classification Search .......... 320/132, 320/104, 136, 149, 144, 134, 150, 152
See application file for complete search history.

(56) References Cited

U.S. PATENT DOCUMENTS

| 5,652,500 | A | * | 7/1997 | Kadouchi et al. | ............. | 320/150 |
|---|---|---|---|---|---|---|
| 2002/0011820 | A1 | * | 1/2002 | Suzuki et al. | ................. | 320/132 |
| 2004/0135544 | A1 | * | 7/2004 | King et al. | .................... | 320/116 |
| 2005/0001593 | A1 | * | 1/2005 | Kawasumi et al. | ........... | 320/132 |

FOREIGN PATENT DOCUMENTS

| JP | 9-130969 (A) | 5/1997 |
|---|---|---|
| JP | 11-283678 (A) | 10/1999 |
| JP | 11-341693 (A) | 12/1999 |
| JP | 2002-008732 (A) | 1/2002 |
| JP | 2002-325369 (A) | 11/2002 |
| JP | 2002-354700 (A) | 12/2002 |
| JP | 2003-309931 (A) | 10/2003 |
| JP | 2004-031012 A | 1/2004 |

* cited by examiner

*Primary Examiner* — Adolf Berhane
*Assistant Examiner* — Nguyen Tran
(74) *Attorney, Agent, or Firm* — Foley & Lardner LLP

(57) ABSTRACT

A cell control unit (20) individually controls cell capacities (SOC) of a first subset (Cf) of a set of cells (Cj) in a heat dissipating manner by using discharge resistors (Rj), a set of estimation elements (21, 31-33, S1-S6, S11-S16, S18-S19) estimates a degree of heat dissipation of the set of cells (Cj) in terms of a temperature rise (To(n)-To(0)) of a substrate (25) of the cell control unit (20), and a set of interruption elements (SWj, S17) interrupts controlling cell capacities (SOC) of a second subset (Cs) of the first subset of cells (Cf) determined in dependence on the estimated temperature rise (To(n)-To (0)).

27 Claims, 6 Drawing Sheets

CELL SET CAPACITY CONTROLLING SYSTEM AND METHOD

BACKGROUND OF THE INVENTION

1. Field of the Invention

The present invention relates to a cell set capacity controlling system and a cell set capacity controlling method.

2. Description of the Related Art

Recent years have observed developments of electric vehicles and hybrid vehicles that have mounted thereon, as a drive power source, a cell set comprised of a set of simplex cells connected in series. The cell set is provided with a cell set capacity controlling system for a capacity adjustment thereof to prevent excessive charge or discharge of individual cells.

Japanese Patent Application Laying-Open Publication No. 2004-31012 has proposed a cell set capacity controlling system, which detects an SOC (state of charge) of a respective cell, determining an average SOC of whole cells, and judges if the average SOC resides within a range of SOC in which a specified cell open-circuit voltage Vo vs. SOC characteristic curve has an inclination ($\Delta Vo/\Delta SOC$) greater than a prescribed value. If the average SOC resides in this SOC range, individual cells of the cell set are SOC-controlled in accordance with an SOC control time and discharge capacity determined as capacity control conditions for a respective cell.

SUMMARY OF THE INVENTION

However, for a cell set increased in number of cells to be SOC-controlled, the amount of dissipated heat due to self-heating discharge resistors increase, so that, for a high-density compact ECU (electric control unit), the heat dissipation goes beyond an ignorable level in view of the current trend aiming at a minimized cell set with a controller inclusive, thus needing an intensified cooling such as by an increased cooling utility or extra cooling implements.

The present invention is made with such points in view. It therefore is an object of the invention to provide a cell set capacity controlling system and a cell set capacity controlling method, which are each adaptive, in capacity adjustment of a cell set, for reducing the amount of heat dissipation to allow for reduced costs such as for the cooling, as well as for an increased density in arrangement of associated circuits to be miniaturized.

To achieve the object, according to an aspect of the invention, there is provided a cell set capacity controlling system comprising: a controller configured to individually control cell capacities of a first subset of a set of cells in a heat dissipating manner, an estimator configured to estimate a degree of heat dissipation of the set of cells; and an interrupter configured to interrupt controlling cell capacities of a second subset of the first subset of cells determined in dependence on the estimated degree of heat dissipation.

To achieve the object, according to another aspect of the invention, there is provided a cell set capacity controlling method comprising: individually controlling cell capacities of a first subset of a set of cells in a heat dissipating manner, estimating a degree of heat dissipation of the cell set; and interrupting controlling cell capacities of a second subset of the first subset of cells determined in dependence on the estimated degree of heat dissipation.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below a preferred embodiment of the invention, which is applied to a control system of an electric vehicle (EV) that controls a capacity in terms of a state of charge (SOC) of a "set of serially connected simplex cells" (hereafter called "cell set" or "battery"), which is now assumed as a battery of the EV for the description to be comprehensible, while the cell set may be a battery for a hybrid vehicle, an engine-driven vehicle, or any apparatus else within an applicable range.

(EV Control System ECS)

Figure 1:
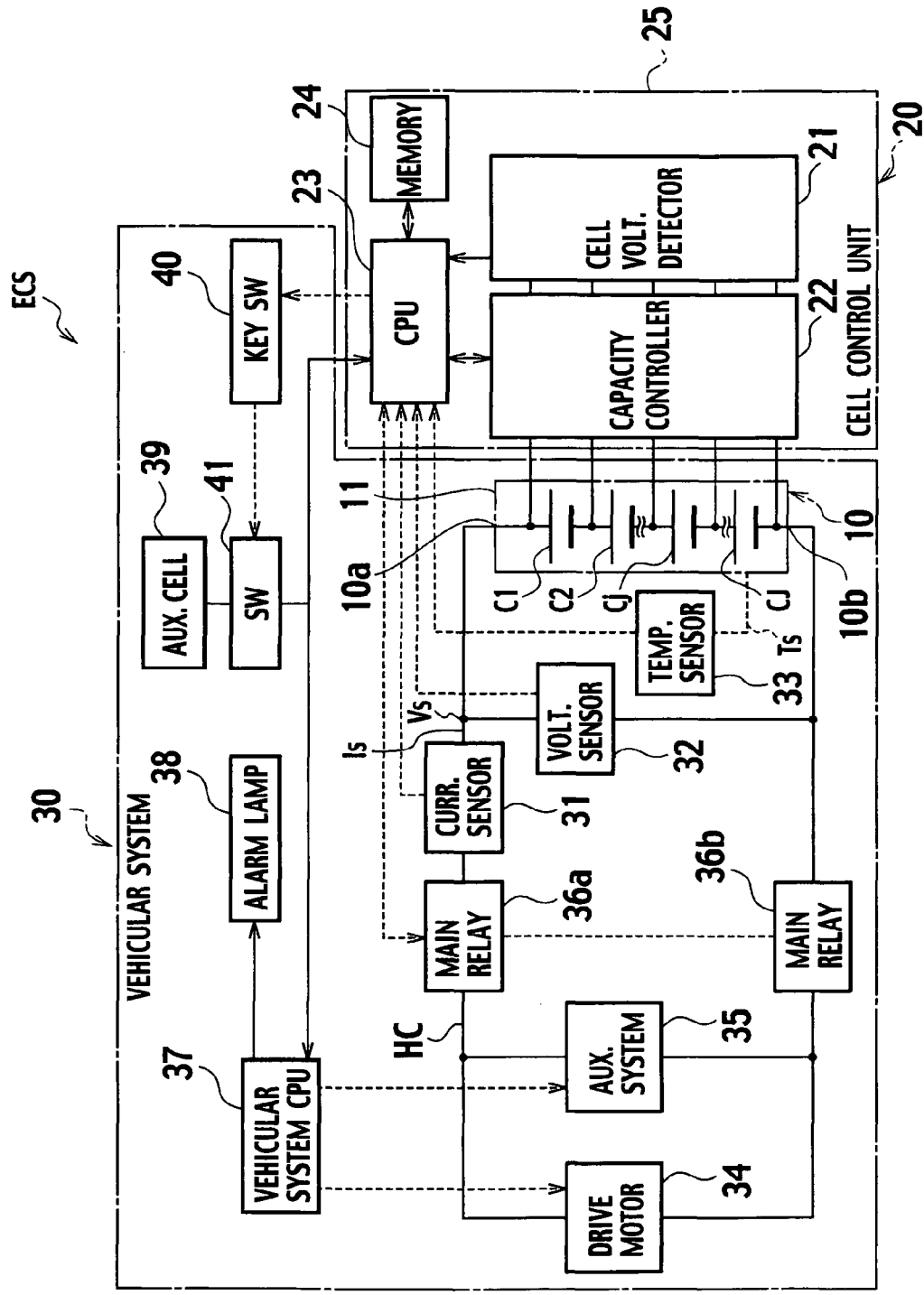
FIG. 1 is a block diagram of an electric vehicle control system including a vehicular system involving a cell set, and a cell control unit.

FIG. 1 shows, in a block diagram, an entirety of the EV control system ECS that involves, for a cell set 10, a cell control unit 20 adapted for charge-discharge control of the cell set 10, and a vehicular system 30 covering various controls as necessary for the EV to run. In the diagram of FIG. 1, represented by solid lines (else than blocks) are heavy or weak current lines, broken lines are signal lines, and dotted lines are boundaries of associated substrate, package, or spaces.

The cell set 10 has a total number of J (J: prescribed integer) secondary cells Cj (j: arbitrary integer from 1 to J) connected in series, and enclosed in a package 11 (defined in FIG. 1 by dotted lines at four sides of cell set 10).

The cell control unit 20 is configured as an ECU (electronic control unit) comprised of a microcomputer, with necessary components therefore including:

a cell voltage detector 21 for detecting a voltage Vj (j=1 to J, cf. FIG. 2) across a respective cell Cj (j=1 to J) of the cell set 10;

a heat-dissipating capacity controller 22 for controlling a charge capacity (hereafter sometimes referred to as $SOC_j$, j=1 to J) of an arbitrary cell Cj, so that the J cells Cj have possibly balanced capacities $SOC_j$;

a CPU (central processing unit) 23 for overall control of the unit 20; and a memory (or set of memories) 24 for storing programs and data, as necessary for the overall control of unit 20.

The control unit 20 has a circuit board as a monolithic substrate 25 (defined in FIG. 1 by dotted lines at four sides of this unit 20) on which the unit components (detector 21, controller 22, CPU 23, and memory 24 inclusive) are built or installed in a spatially dense condition, so that they (unit components and substrate) receive dissipated heat from the controller 22. The substrate 25 of unit 20 is located in a thermally interactive vicinity of the package 11 of cell set 10, or vice versa.

Figure 2:
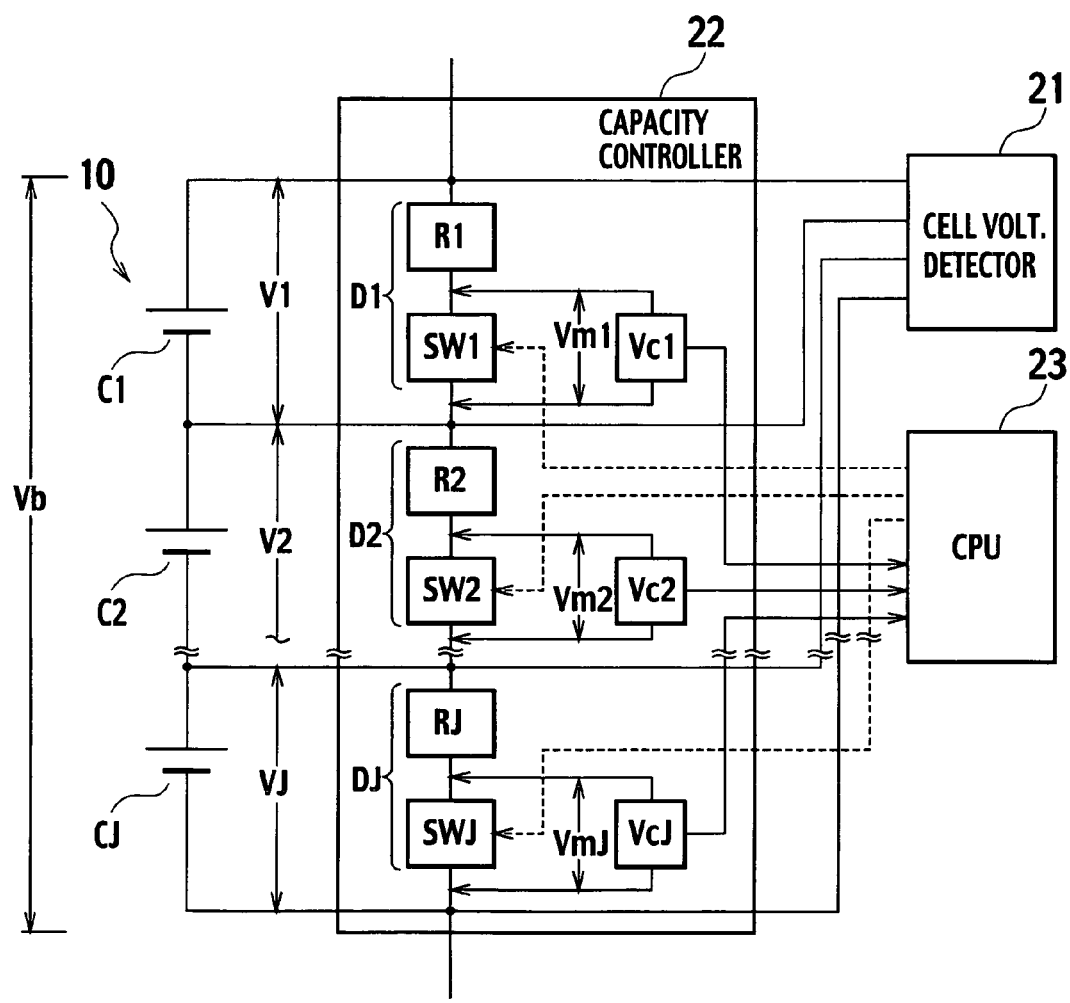
FIG. 2 is a block diagram of a capacity controller of the cell control unit.

The cell voltage detector 21 is electrically connected, via the capacity controller 22 as seen from FIG. 2, with the J cells Cj of cell set 10, so that their open-circuit voltages Vj in a current-cycle can be individually detected by the detector 21. Detected voltages Vj are sequentially sampled to read to the CPU 23, where their data is processed to be stored as voltage-representative data in the memory 24.

The capacity controller 22 is configured to have, under control of the CPU 23, selected cells Cj discharge to thereby suppress capacity variations among J cells Cj as a whole, so that a capacity adjustment is achieved among them (Cj) in a capacity variation correcting manner or in a capacity balancing manner, which will be detailed later.

The CPU 23 reads voltage data of J cells Cj from the cell voltage detector 21, and processes them to verify how voltages Vj of J cells are distributed (cf. FIG. 6) in the cell set 10, checking for a change in the distribution of voltages Vj after every charge or discharge of a specified reference capacity relative to an initial condition at a (unloaded) startup of the vehicular system 30. Then, based on a result of this verification, CPU 23 outputs, to the capacity controller 22, a capacity control command indicating necessary conditions for adequate capacity adjustment. The vehicular system 30 may enter an off state, whereupon the capacity controller 22 is controlled to interrupt the capacity adjustment of cell set 10, when CPU 23 stores, in the memory 24, remaining capacity control conditions for each cell Cj. The capacity control conditions include a discharge capacity of cell Cj, and a capacity control period (discharge time) therefor.

The memory 24 may be a RAM (random access memory) or nonvolatile memory, adapted to store various data supplied from the CPU 23. Stored data can be read by request from the CPU 23.

The vehicular system 30 is configured:

for detecting working conditions of the cell set 10, with a current sensor 31 for detecting a charge or discharge current (hereafter sometimes collectively called "cell-set current" or "battery current") Is to or from the cell set 10, as it is a flow of regenerative or accumulated electric energy conducted through a heavy current circuit HC connected to the cell set 10, a voltage sensor 32 for detecting a cell-set terminal voltage (hereafter sometimes called "battery voltage") Vs across the cell set 10, and a temperature sensor 33 for detecting a cell-set temperature (hereafter sometimes called "battery temperature") Ts as a representative temperature of the cell set 10;

for driving the EV, with a drive motor 34 for generating drive power of the EV, as well as for supplying regenerative power to the cell set 10, an auxiliary system 35 as an entirety of auxiliary appliances and implements furnished to the EV and supplied with power from the cell set 10, and a pair of main relays 36a, 36b for turning on and off power supply via the heavy current circuit HC between the cell set 10 and a parallel combination of drive motor 34 and auxiliary system 35; and for controlling the EV, with a vehicular system CPU 37 governing an entirety of the vehicular system 30, with the CPU 23 of cell control unit 20 inclusive, an alarm lamp 38 for giving an alarm to a driver or passenger of the EV, an auxiliary cell 39 as a backup power supply for supplying auxiliary power to the CPU 23 and the CPU 37, depending on a state of an associated power supply switch (SW) 41, and a key switch 40 for generating a key signal to control power supply from the auxiliary cell 39.

The temperature sensor 33 serves for monitoring generation of heat when the cell set 10 discharges, by detecting the cell-set temperature (or battery temperature) Ts, which is sampled to read in the CPU 23.

The current sensor 31 detects the magnitude of a current discharged from the cell set 10 for power supply to the parallel combination of drive motor 34 and auxiliary system 35, as the cell-set current (or battery current) Is, which is sampled to read in the CPU 23. The voltage sensor 32 detects a potential difference developed, between a positive-pole electrode 10a and a negative-pole electrode 10b of the cell set 10, when electric power is supplied from the cell set 10 to the parallel combination of drive motor 34 and auxiliary system 35, as the cell-set voltage (or battery voltage) Vs, which is sampled to read in the CPU 23.

The paired main relays 36a, 36b are installed respectively on hot and ground lines of the heavy current circuit HC interconnecting the cell set 10 and the parallel combination of drive motor 34 and auxiliary system 35, and are synchronously operated by a command from the CPU 23 for on-off control of current conduction between the cell set 10 and the parallel combination of drive motor 34 and auxiliary system 35.

The drive motor 34 serves as a drive power source for supplying drive power to the EV by consuming accumulated electric energy in the cell set 10, when the EV is powered to travel. During a powered travel of EV, the main relays 36a, 36b are turned on, whereby dc (direct current) power is supplied from the cell set 10 to the parallel combination of drive motor 34 and auxiliary system 35, where it is changed to ac (alternating current) power by an unshown inverter, to be fed to the drive motor 34. In a regenerative condition of EV such as in deceleration or when running down a hill, the drive motor 34 regenerates ac power, which is converted into dc power and charged via main relays 36a, 36b to the cell set 10.

The auxiliary system 35 includes an air conditioner, lamps, wipers, etc., which are operated with electric power supplied from the cell set 10.

The vehicular system CPU 37 is adapted for controlling the drive motor 34 to control a travel of EV, and for controlling the auxiliary system 35 to control operations of auxiliary appliances and implements. The CPU 37 then calculates respective amounts of power required at the drive motor 34 and the auxiliary system 35. Then, by communications with the CPU 23, that CPU 37 controls this CPU 23 to operate the main relays 36a, 36b, so that a necessary amount of power is supplied to the parallel combination of drive motor 34 and auxiliary system 35.

The alarm lamp 38 is controlled by the CPU 37 to light or blink to give an alarm to the driver or passenger of EV, when the vehicular system 30 is troubled.

The auxiliary cell 39 is adapted to serve as a backup power supply for driving the CPU 23 and the CPU 37 in accordance with a key signal generated by the key switch 40. That is, the auxiliary cell 39 is provided with the power supply switch 41, which turns on, when the key switch 40 is operated by the driver or passenger, to enter a conductive state for supplying electric power to drive the CPU 23 and the CPU 37, for an EV startup.

(Capacity Controller 22)

FIG. 2 shows, in a block diagram, an arrangement of the capacity controller 22. As seen from FIG. 2, the capacity controller 22 is configured with a total number of J cascaded capacity control circuits Dj (j=1 to J), of which a j-th one is connected, in parallel, to a j-th one Cj of the serially connected J cells Cj of cell set 10. The j-th capacity control circuit Dj is configured as a serial connection of a discharge resistor Rj and a control switch SWj, and has a switch-monitoring voltage sensor Vcj for detecting a voltage Vmj (j=1 to J) across the control switch SWj to monitor a working condition of the switch SWj.

The j-th capacity control circuit Dj composed of resistor Rj and switch SWj is adapted, by controlling the switch SWj from the CPU 23, for discharging via the resistor Rj an amount of charged electric energy of a corresponding cell Cj to control the $SOC_j$, as necessary for capacity adjustment of the cell set 10. The control switch SWj is employed as a switch for switching a discharge of cell Cj and an interruption thereof, and may be a semiconductor switching element, such as TFT (thin film transistor) or FET (field effect transistor), or relay, if applicable.

For capacity adjustment of cell set 10, the CPU 23 outputs on-commands to control switches SWj connected in parallel to those cells Cj selected as objects to be SOC-controlled, to turn the switches SWj on, i.e., conductive, whereby electric energy charged till then in each object cell Cj to be SOC-controlled is caused to outflow via the conductive control switch SWj, as a limited current through the discharge resistor Rj, where it is consumed, so that the object cell Cj has its $SOC_j$ discharged to be reduced by a fraction commensurate with a consumed amount of electric energy.

The CPU 23 controls the control switch SWj to turn on (conductive) and off (open-circuited), making a duty control (i.e. on-load time control) by regulating the ratio of a duty period (i.e. on-load time) to a duty cycle (i.e. on-load time+ no-load time). The duty ratio for duty control depends on capacities to be discharged and an available discharge time for SOC control of object cells Cj.

As described, in the cell control unit 20, the CPU 23 is adapted to achieve a capacity balance of object cells Cj of SOC control, by conducting SOC-control currents through associated discharge resistors Rj, as necessary for capacity adjustment of the cell set 10. Along with the SOC control, the CPU 23 monitors working conditions of control switches SWj, to verify a balance of SOC control of object cells Cj. For each cell Cj or each object cell Cj, the voltage sensor Vcj is controlled to detect a voltage Vmj across the control switch SWj, and a resultant data is sampled to read to the CPU 23.

More specifically, in the capacity controller 22, at each capacity control circuit Dj, the control switch SWj is made up by a transistor, of which a collector and an emitter are connected to the voltage sensor Vcj, so that an emitter to collector voltage of the transistor is detected as the voltage Vmj. The emitter to collector voltage Vmj is held to a terminal voltage Vj across cell Cj, while the transistor is off, but drops to an approx. zero, i.e., a 0 [V], when the transistor is turned on by CPU23. The CPU 23 is thus adapted to verify, from the voltage Vmj detected by the. voltage sensor Vcj a working condition of the transistor, i.e., a state of SOC control of associated object cell Cj.

Thus, the capacity controller 22 is adapted for individual SOC control of J cells Cj of cell set 10, allowing for prevention of an excessive charge or discharge at any cell Cj that otherwise might have caused an insufficient use of capacity of the cell set 10.

The EV control system ECS may simply have the cell voltage detector 21 or cell-set voltage sensor 32 for voltage detection of cell set 10. To cover this case, the memory 24 has stored therein a Vb (battery voltage)-SOC (capacity in state of charge) characteristic table representing a relationship between an SOC [%] of the battery or cell set 10 and a battery or cell set open-circuit voltage Vb [V] defined in terms of: a total sum ($\Sigma$Vj) of J cell open-circuit voltages Vj detected by the cell voltage detector 21; or the cell-set terminal voltage Vs detected by the voltage sensor 32, so that the CPU 23 can refer to the table to determine a battery or cell set SOC. The cell-set voltage Vs is given by a direct detection of cell set open-circuit voltage Vb. Description will be made of an estimation of cell set SOC by use of cell voltages Vj.

(Estimation of Cell Set SOC by Cell Voltages Vj)

Figure 3:
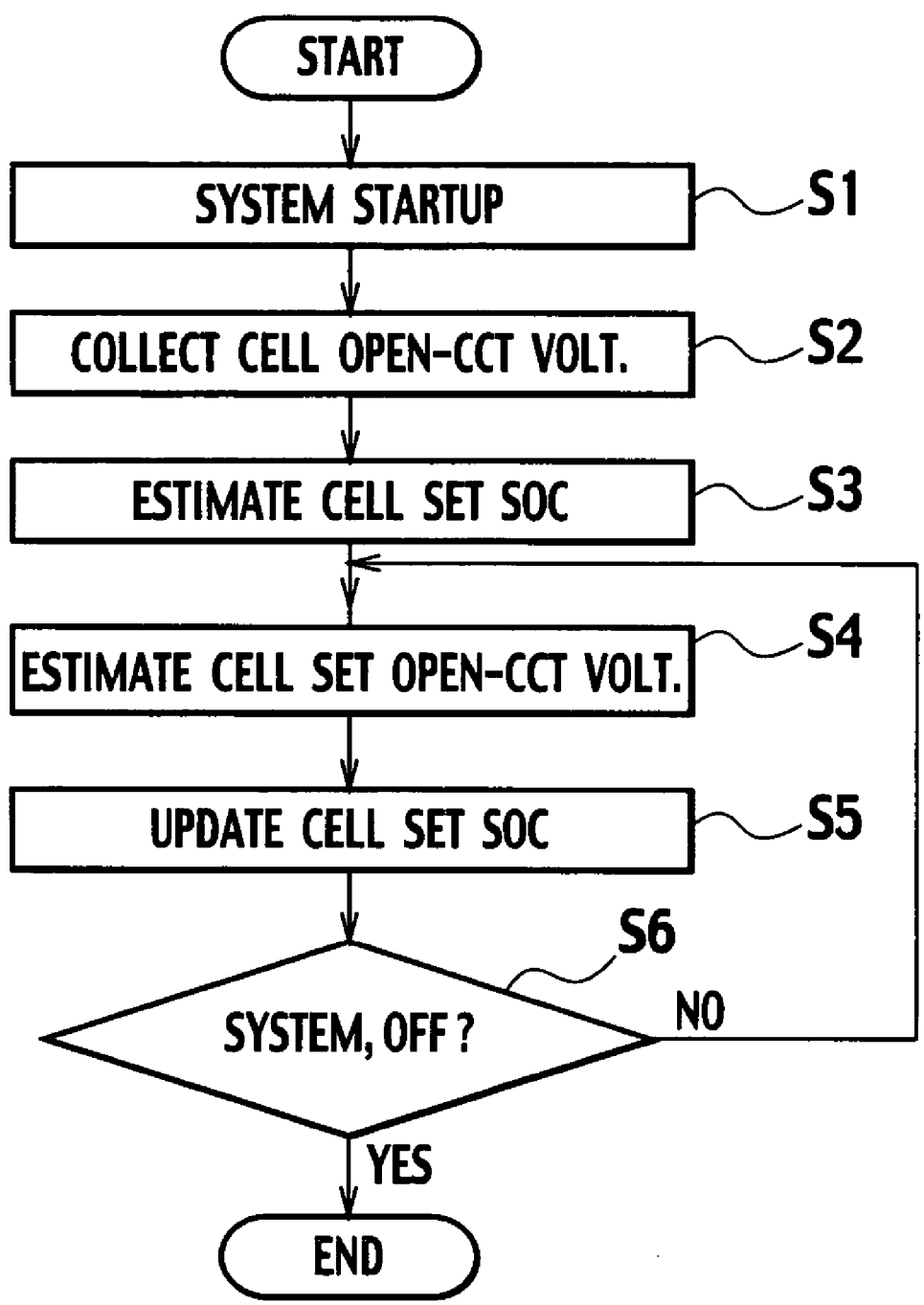
FIG. 3 is a flow chart for SOC estimation of the cell set.

FIG. 3 shows, in a flow chart, a programmed control procedure for the CPU 23 to detect open-circuit voltages Vj of J cells Cj and estimate an SOC of cell set 10.

At a step S1, with the key switch 40 operated on, the auxiliary power supply switch 41 is turned on for supply of electric power from the auxiliary cell 39, whereby the EV control system ECS starts, with the vehicular system 30 and cell control unit 20 inclusive, so that the CPU 23 enters a subsequent step S2.

At the step S2, before turning on the main relays 36a, 36b, the CPU 23 controls the cell voltage detector 21 to detect open-circuit voltages Vj of J cells Cj, and calculates a total sum of detected voltages Vj, as a cell set open-circuit voltage Vb.

At a subsequent step S3, based on the voltage Vb calculated in the step S2, the CPU 23 enters an estimation of cell set SOC. In other words, the CPU 23 determines an SOC of cell set 10 as an initial value of estimation, by matching the Vb (=$\Sigma$Vj) in step S2 with a Vb-SOC characteristic table read from the memory 24. This table is prepared as a map a Vb [V] vs. SOC [%] characteristic curve of the cell set 10.

Figure 4:
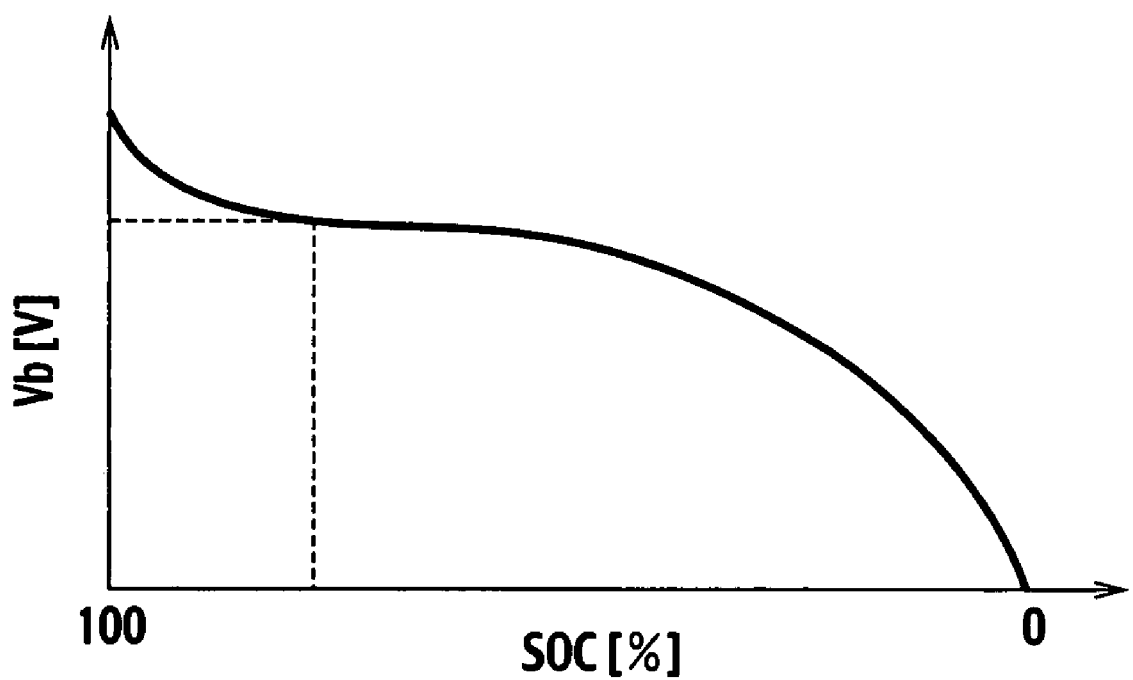
FIG. 4 is a graph of a battery voltage vs. SOC characteristic curve.

FIG. 4 illustrates a typical Vb vs. SOC characteristic curve for a battery (10) composed of a set of J lithium-ion secondary cells (Cj) connected in series. As in FIG. 4, the cell set open-circuit voltage Vb is varied in dependence on the cell-set SOC, with an increased inclination for a low cell-set SOC range under approx. 30% and for a high cell-set SOC range over approx. 95%, but with a decreased inclination for a medium cell-set SOC range from approx. 30% to approx. 95%.

At a subsequent step S4, the CPU 23 controls the cell voltage detector 21 to detect open-circuit voltages Vj of J cells Cj, and the current sensor 31 to detect a discharge current Is of cell set 10. Based on a correlation of detected voltages Vj and current Is, the CPU 23 calculates an open-circuit voltage Vb of cell set 10 as a total sum of J voltages Vj, matching the open-circuit voltage Vb with the Vb-SOC characteristic table.

The, at a step S5, based a result of matching in step S4, the CPU 23 updates the value of cell set SOC.

At a decision step S6, the CPU 23 makes a judgment like in step S1 as to whether or not the EV control system ECS or vehicular system 30 is tuned off. If this system is off (i.e. Yes), the control flow goes to an end. Unless it is off (i.e. No), the flow goes to the step S4 to repeat steps therefrom.

In the EV control system ECS, even in service of drive motor 34 or auxiliary system 35 as well as during capacity adjustment, the steps S4 to S6 are repeated as a cycle, to thereby update the cell set SOC every control cycle.

(SOC control of cells Cj)

Figure 5:
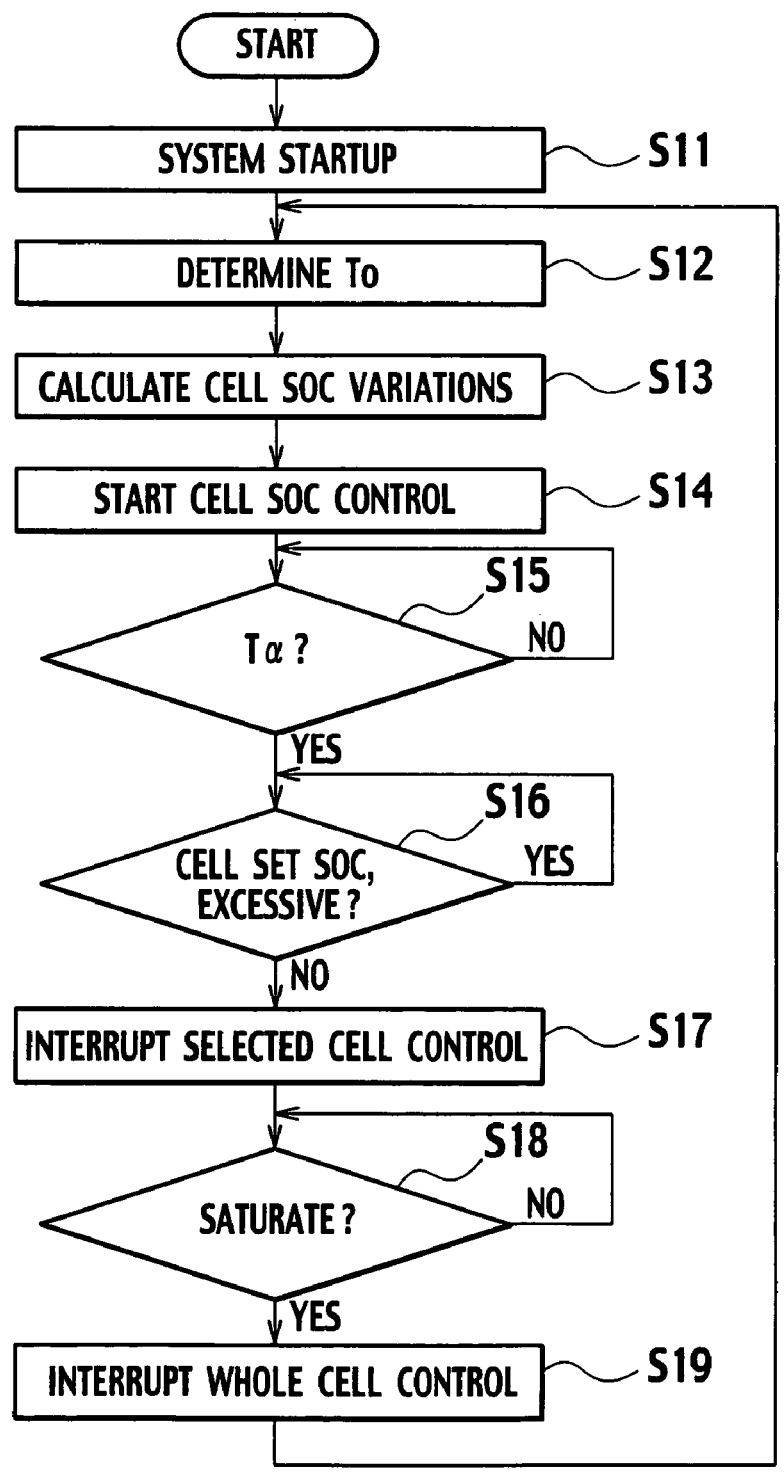
FIG. 5 is a flow chart for cell SOC control, and control interruption.

FIG. 5 shows, in a flow chart, a programmed control procedure for the CPU 23 to execute a capacity adjustment of the cell set 10, as a parallel process to FIG. 3.

The capacity adjustment of cell set 10 is effected along the control flow of FIG. 5, by balancing SOC of cells Cj under control of the CPU 23, i.e., by controlling discharge of cells Cj so as to reduce or minimize SOC variations (or dispersion thereof) among the cells Cj. If the substrate 25 of cell control unit 20 has a temperature (surface or outside temperature To in this embodiment) exceeding a threshold (prescribed outside temperature T$\alpha$), the SOC control is interrupted for a subset of the set (10) of cells Cj small of SOC variation (or dispersion thereof), to thereby reduce heat dissipation from associated discharge resistors Rj.

First, at a step S11, with electric power supplied from the auxiliary cell 39, the EV control system ECS is started like the step S1.

Then, at a step S12, an outside temperature To of the substrate 25 of cell control unit 20 is determined as an initial value thereof depending on a cell-set temperature Ts detected by the temperature sensor 33 in a current cycle.

It is noted that the substrate 25 serves as a base of cell control unit 20 having mounted thereon on cell voltage detector 21, capacity controller 22, CPU 23, and memory 24, and has a high tendency to dissipate heat by radiation, convection, transmission, or transfer. The substrate 25 is arranged in a thermally interactive vicinity of the package 11 of cell set 10, so that the CPU 23 can determine a temperature (To) of the substrate 25 from a temperature (Ts) of cell set 10 detected by the temperature sensor 33, without the need of another temperature sensor to be mounted on a surface of the substrate 25. The CPU 23 is thus adapted to function as a temperature detector for detecting (by calculation) an outside temperature To of substrate 25, such as about the CPU 23, depending on an atmospheric temperature (or inside or outside temperature) Ts of the package 11 of cell set 10. The CPU 23 may determine an outside temperature To of substrate 25 by: subtracting a specified value, such as due to a heat transfer coefficient of substrate 25, from a temperature Ts detected at the temperature sensor 33; employing a map table, such as of empirical data, describing a relationship between a representative temperature Ts of cell set 10 or package 11 and a representative temperature To of substrate 25; or using a numeric operator.

Figure 6:
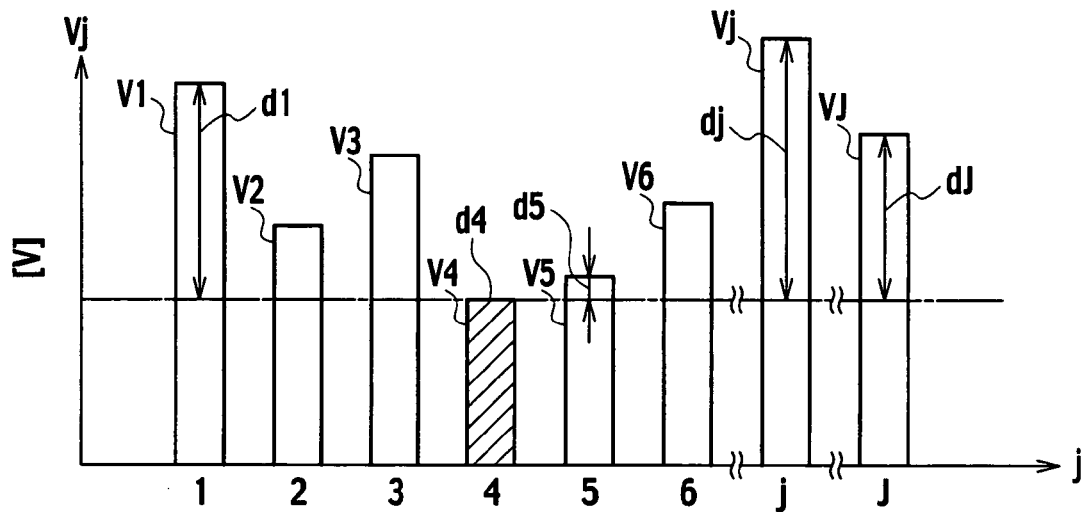
FIG. 6 is a graph of a dispersion of cell voltages.

At a subsequent step S13, the CPU 23 calculates SOC variations (or dispersion thereof) among cells Cj of cell set 10 depending on cell voltages Vj detected by the cell voltage detector 21. FIG. 6 illustrates a dispersion of variations dj (j=1 to J) of cell voltages Vj relative to a target voltage (V4 in this case) of control among J cells Cj. In FIG. 6, the axis of abscissa represents the identification j of cell Cj, and the axis of ordinate represents the cell voltage Vj.

Given such a set of detected cell voltages Vj, the CPU 23 verifies a cell Cj (j=4) of lowest voltage Vj (j=4), and sets it as a target cell Ct (i.e. identification "j" of control target is set to "t", which is 4 in this case), whereby its $SOC_t$ is set as a target of SOC control. The CPU 23 is thereby adapted to recognize a certain cell Cj (e.g. j=5 in this case) small of difference (d5) in voltage relative to the target cell Ct (t=4) (i.e. d5=V5−V4), as a cell Cj small of variation in SOC relative to the target $SOC_t$, and another cell Cj (e.g. j=1 in this case) large of difference (d1) in voltage relative to the target cell Ct (t=4) (i.e. d1=V1−V4), as a cell Cj large of variation in SOC relative to the target $SOC_t$. It is noted that the cell set 10 may have two or more target cells Ct, as they {Ct} have identical or substantially equivalent voltages Vt The CPU 23 selects, as a first subset {Cf} of the set 10 of cells {Cj}, whole cells Cf (f=1 to 3 and 5 to J) else than target cell(s) Ct (i.e. {Cf}={Cj}−{Ct}), to be object cells Cf of cell SOC control. It is noted that, as used herein, { } means a set of elements described therein. Then, the control flow goes to a subsequent step S14 to start cell SOC control.

At the step S14, the CPU 23 turns on respective control switches SWf (f=1 to 3 and 5 to J) of the object cells Cf (f=1 to 3 and 5 to J), thereby controlling these cells Cf to discharge via corresponding discharge resistors Rf (f=1 to 3 and 5 to J), whereby their cell SOC control starts. Along with the SOC control, the resistors Rf are heated by electric energy consumed therein, causing the outside temperature To of substrate 25 of the cell control unit 20 to start rising.

To this point, at a decision step S15, the CPU 23 judges whether or not an estimated value substituting for the outside temperature To of substrate 25 has reached a prescribed permissible upper limit Tα. If this limit Tα is reached, the control flow goes to a subsequent decision step S16, which is an entry to a later-described interruption (at a step S17) of SOC control of a second subset {Cs} of the first subset {Cf} of cells Cf, as cells Cs of the second subset {Cs} have relatively small SOC variations to a target cell Ct of SOC control.

Unless the limit Tα is reached, the flow repeats the step S15, so that an associated estimation is repeated.

In other words, in each repeated step S15, the CPU 23 estimates a rise of substrate outside temperature To from a value of previous estimation, as a sum of products of discharge current, discharge resistance, and discharge time of associated discharge resistors Rf (f=1 to 3 and 5 to J) in a current estimation cycle.

More specifically, letting To(n−1) be the estimated value for substrate outside temperature To in the previous (n−1)-th estimation, To(n) be an estimated value for substrate outside temperature To in the current n-th estimation, and ΔT be an estimated rise from To(n−1) to To(n), the CPU 23 estimates this rise ΔT by expression (1), such that $$\Delta T = k \left\{ \sum_j (Rj)^p \times (\text{discharge current})^q \times (\text{discharge time})^r \right\} \quad (1)$$

where the sum of j is taken for respective associated j's (to be f=1 to 3 and 5 to J, in the case of FIG. 6), k is a specified factor (k>0) for the conversion from electric energy to temperature in consideration of a balance of associated heat and a heat capacity of the substrate 25 of cell control unit 20, and p, q, and r are variable powers to be specified in an object-fit manner.

Simply for estimation in concern, k may be an empirical factor or 1, p may be 2, 1, or 0, q may be 1 or 0, and r may be 1 or 0. In particular cases (e.g. for a small dispersion of voltage variations df), j may be taken for a representative single f.

Then, for the n-th estimated value of expression (2), such that $$To(n) = To(n-1) + \Delta T \quad (2),$$

the CPU 23 judges whether or not an inequality of expression (3) is met, such that $$To(n) \geq T\alpha \quad (3),$$

where the permissible upper limit Tα represents a lower end of a transition zone to a critical range of estimated value To(n) that substitutes for an actual substrate outside temperature To, while the critical range as well as the transition zone thereto is determined in advance in consideration of design data for a cooling performance of the cell control unit 20 and empirical data therefor, such that, in the critical range, the substrate 25 would have been heated in due course to an extent that might have given a damage to any component thereon, and the transition zone has a sufficient width for an ensured fault-free operation.

At the step S15, unless the inequality (3) is met, the step S15 is repeated. When the inequality (3) is met, the control flow goes to the step S16 At the step S15, the CPU 23 may judge, for an intermediate value (or threshold) Tβ of the transition zone, whether or not an inequality of expression (4) is met, such that $$To(n) > T\beta \quad (4).$$

In this case, the step S15 is repeated unless the inequality (4) is met. When this is met, the control flow goes to the step S16.

It is noted that the estimation is not a real detection (with fixed scales), but an imaginary operation (to be scale-free, or at least scale-flexible) for a decision. Accordingly, at the step S15, the decision may depend on an elapsed time for capacity control (i.e. discharge time), which means, in the expression (1), k=1, p=0, q=0, r=1, and j is taken for a representative single f of the first subset {Cf} of the set 10 of cells Cj.

For example, the CPU 23 may employ the expression (4), and set, as a threshold Tβ for the decision at step S15, the discharge time to be smaller, as the initial value (determined at step S12) of substrate outside temperature To is greater. In this case, the CPU 23 makes a judgment, when the threshold Tβ is exceeded, that a certain permissible upper limit Tα should have been reached.

At the step S16, the CPU 23 reads a latest data on the SOC of cell set 10, as it is updated every control cycle by the charge capacity estimation process of FIG. 3, and judges whether or not the last cell set SOC is excessive, i.e., whether it is greater than a reference value, which may be 90% or near. The reference value of cell set SOC is preset as a threshold for judgment to conclude the current SOC of cell set 10 to be so high that the cell set 10 may be overcharged if supplied with a maximum amount of regenerative electric energy such as from the drive motor 34. As described, the SOC estimation process of FIG. 3 is executed in parallel with the SOC adjustment process of FIG. 5, so that the data of cell set SOC to be read at the step S16 is updated to be latest.

Upon a judgment for the cell set SOC to be greater than the reference value, the CPU 23 repeats the step S16, so that, for all current object cells Cf (i.e. the first subset of cells {Cf}), the SOC control is continued without interruption. Such continuation of SOC control is considered for a resultant discharge amount to work as a margin against overcharge. The cell SOC control initiated at step S14 involves an amount of discharged energy, whereby the cell set SOC is gradually reduced (without excessive discharge), so that overcharge is prevented.

But, upon a judgment for the cell set SOC not to be greater than the reference value, the CPU 23 enters a subsequent step S17.

Then, at the step S17, the CPU 23 selects those cells Cs (i.e. the second subset of cells {Cs}) of which SOC control is to be interrupted, as the substrate outside temperature To of cell control unit 20 has reached the permissible upper limit Tα by estimation.

For the selection of cells Cs, the CPU 23 first calculates a temperature difference dT (=Tα−To(0)) between an initial value To(0) of substrate outside temperature To and the permissible upper limit Tα in estimation, to recognize how was a degree or extent of SOC control made in between.

Then, the CPU 23 determines the number of cells Cs to be thinned or reduced (for interruption of their SOC control) from the first subset of cells {Cf} as objects of current SOC control, by matching the temperature difference dT with a table map describing a relationship between the difference dT (as the degree of SOC control made therefor) and the number of cells to be reduced (for the interruption of SOC control).

Figure 7:
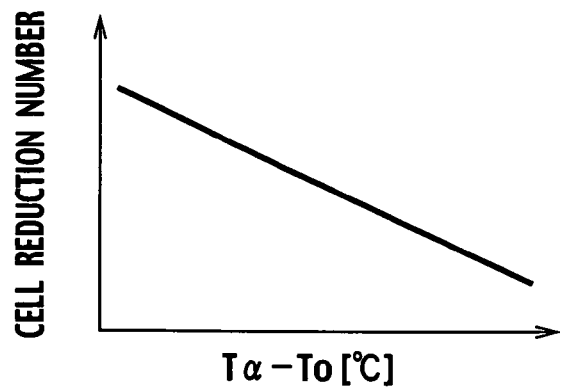
FIG. 7 is a graph of cell reduction number.

As seen from FIG. 7 illustrating this relationship, the cell reduction number is increased, as the difference dT (i.e. prescribed Tα-variable To(0)) decreases, i.e., as the initial value To(0) of substrate outside temperature To gets higher. In accordance with the cell reduction number thus determined, the CPU 23 selects the cells Cs to be reduced in order (as elements of the second subset of cells {Cs}), with a priority to the cell SOC to be smaller in variation and closer to the target cell $SOC_t$, and controls associated switches SWs to be off.

With the reduction of cells Cs from object cells Cf of SOC control, the total amount of heat dissipation from J discharge resistors Rj of cell set 10 is commensurately reduced, thus lowering the substrate outside temperature To of cell control unit 20.

At a subsequent step S18, the CPU 23 first estimates:

a saturation temperature Ts where the lowering outside temperature To of substrate 25 should be saturated, from empirical data on a heat balance between heat generation at the remaining cells Cf (hereafter referred to as Cd) in a difference set {Cd} of the first subset {Cf} minus the second subset {Cs} of cells and heat release from the substrate 25 of cell control unit 20; and a saturation time for the saturation of substrate outside temperature To, as it is counted from the timing of cell number reduction when the switches SWs are turned off.

Then, the CPU 23 judges whether the estimated saturation time is elapsed, to thereby check if the substrate outside temperature To is saturated. When the saturation time is elapsed, the CPU 23 assumes that the substrate outside temperature To is saturated, and enters a step S19, where it stops SOC control of the difference set of cells {Cd}, so that the SOC control of cell set 10 is wholly stopped, before the control flow again goes to the step S12 to enter the next control cycle in the flow of FIG. 5.

At this step S12, the CPU 23 sets the saturation temperature Ts estimated at step S18 in the previous control cycle, as an initial value To(0) of substrate outside temperature To in the current control cycle, before reentering a sequence of steps S13 et seq., determining anew a target $SOC_t$ in the set of cells {Cj}, a first subset of cells {Cf}, and a second subset of cells {Cs} defining a difference set of cells {Cd} relative to the first subset.

As will be seen from the embodiment described, in the SOC adjustment of cell set 10 in EV control system ECS, for selected cells Cs of the cell set 10 as having relatively small SOC variations, their SOC control is interrupted when a permissible upper limit Tα of the substrate outside temperature To of cell control unit 20 is reached in estimation, whereby the control system ECS has successfully reduced heat dissipation from discharge resistors Rj.

It will be seen that according to the embodiment, a cell set capacity controlling system ECS is adapted to control charge capacities $SOC_j$ of cells Cj of a cell set 10, and comprises: a controller configured (as an exemplary combination of a capacity controller 22, a CPU 23, and a memory 24 of a cell control unit 20) to individually control cell capacities $SOC_f$ of a first subset {Cf} of a set of cells {Cj} in a heat dissipating manner (by use of discharge resistors Rj conducting flows of charged electric energy in the first subset of cells {Cf}); an estimator configured (as an exemplary combination of a current sensor 31, a voltage sensor 32, and a temperature sensor 33 of a vehicular system 30, and a cell voltage detector 21 and voltage sensors Vcj of the cell control unit 20) to estimate a degree of heat dissipation of the set of cells {Cj} (by use of a combination of expressions (1), (2), and (3) or (4), and steps S1 to S6, S11 to S16, and S18 to S19 executed by the CPU 23); and an interrupter configured (as an exemplary combination of control switches SWj and a step S17 executed by the CPU 23) to interrupt controlling cell capacities $SOC_s$ of a second subset {Cs} of the first subset of cells {Cf} determined in dependence on the estimated degree of heat dissipation.

(Advantageous Effects of Embodiment)

According to the embodiment, letting To(n−1) be an estimated value for substrate outside temperature To in a previous (n−1)-th estimation, To(n) be an estimated value for substrate outside temperature To in a current n-th estimation, and ΔT be an estimated rise from To(n−1) to To(n), a CPU 23 estimates this rise ΔT by expression (1), such that $$\Delta T = k \left\{ \sum_j (Rj)^p \times (\text{discharge current})^q \times (\text{discharge time})^r \right\},$$

where the sum of j is taken for respective associated j's or a representative single j, k is a variable factor (k>0), and p, q, and r are variable powers, and they can be specified in an object-fit manner, thus allowing for scale-free or scale-flexible wide applications to various apparatus provided with a cell set needing an SOC adjustment in consideration of heat balance, irrespective of how respective cells are connected in the cell set, serial, parallel, or serial-parallel.

According to the embodiment, among a set of cells {Cj}, at least one cell having a minimum $SOC_t$ is selected as a target cell Ct, and among a first subset {Cf} of the cell set {Cj}, a second subset {Cs} having relatively small SOC variations to the target cell Ct is selected to stop the SOC control, allowing for an adequate SOC adjustment of cell set {Cj} to be performed cell-wise in consideration of variations of charge capacity and deterioration as well as temperature characteristic of respective cells.

According to the embodiment, a capacity controller 22 is configured to continue cell SOC control, without interruption, when the cell set 10 has a greater SOC than a reference value, thereby allowing for the capacity control function to constitute an overcharge preventor against an excessive cell set SOC.

According to the embodiment, the number of cells Cs to be reduced for control interruption from cells Cf to be SOC-controlled by the capacity controller 22 is increased, as an initial value To(0) of an outside temperature To of the substrate 25 gets higher, so that even if the initial value To(0) is high, the substrate outside temperature To is suppressed against reaching the permissible upper limit Tα in a short while, thus allowing for the number of cells Cf to be always controlled adequate in consideration of the substrate outside temperature To.

According to the embodiment, a saturation temperature Ts for the substrate outside temperature To is estimated in accordance with the number of remaining cells Cd to be SOC-controlled after interruption of control of cells Cs, and once the temperature To is saturated in a current control cycle, the saturation temperature Ts is set in the next control cycle as an initial value To(o) of temperature To to be based on for new determination of a target $SOC_t$ and selection of cells Cs of which SOC control is to be interrupted, thus allowing for a cell set SOC adjustment to be consecutively executed under similar conditions for decisions, after a vehicular system 30 is started.

According to a modification of the embodiment (ECS) described, when a substrate 25 of a cell control unit 20 has an excessive outside temperature To in estimation relative to a threshold Tβ, for selected cells Cs small of SOC variation, their SOC control is interrupted to thereby reduce a total amount of heat generation at discharge resistors Rj, thus allowing for a scale down of system cooling performance as well as of components employed, dense configuration of circuitry, and compact packaging.

According to a modification of the embodiment, a permissible upper limit Tα of substrate outside temperature To is assumed to have been reached, when an estimated control time based on an initial value To(0) of the substrate outside temperature To is elapsed in a real duration of time for SOC control, so that discharge current is substantially constant during the SOC control, allowing for the amount of heat dissipation at self-heating discharges resistors Rj to be calculated from the number of paralleled cells. Accordingly, a decision for the control can be made without always monitoring the substrate outside temperature To of cell control unit 20.

The contents of Japanese Patent Application 2004-255759 filed Sep. 2, 2004 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A cell set SOC controlling system comprising:
   a controller configured to individually control cell SOCs of a first subset of a set of cells in a heat dissipating manner, the first subset including cells other than a target cell, wherein a voltage of the target cell is set as a target voltage to control cell SOCs thereof as one subset;
   an estimator configured to estimate a degree of heat dissipation of the set of cells; and
   an interrupter configured to interrupt controlling cell SOCs of a second subset of cells included in the first subset of cells after starting to charge the cells of the first subset and determined in dependence on the estimated degree of heat dissipation, cells of the second subset having a relatively small cell SOC variation with respect to the target cell.

2. The cell set SOC controlling system as claimed in claim 1, wherein
   the controller comprises a set of control elements configured to control cell SOCs of the set of cells, and a substrate configured to be furnished with the set of control elements,
   the estimator is configured to estimate the degree of heat dissipation in terms of a rise of a temperature of the substrate, and
   the interrupter is adapted, in the event of the rise of the temperature of the substrate exceeding a threshold therefor, to interrupt controlling cell SOCs of the second subset of cells.

3. The cell set SOC controlling system as claimed in claim 2, wherein
   the controller is adapted, as the temperature of the substrate has a higher initial value, to have the second subset of cells include an increased number of cells.

4. The cell set SOC controlling system as claimed in claim 2, wherein
   the controller is adapted, in the event of a SOC of the set of cells exceeding a threshold thereof, to render the second subset of cells identical to the first subset of cells.

5. The cell set SOC controlling system as claimed in claim 2, wherein
   the estimator is configured to estimate the rise of the temperature of the substrate in terms of an elapsed time, and the interrupter is adapted, in the event of the elapsed time exceeding a threshold thereof, to assume the rise of the temperature of the substrate is exceeding the threshold therefor.

6. The cell set SOC controlling system as claimed in claim 2, wherein
the set of cells include a set of secondary cells connected in series,
the set of control elements includes a set of discharge circuits connected cell-wise to the set of secondary cells, and
the interrupter comprises a set of switches installed in the set of discharge circuits.

7. The cell set SOC controlling system as claimed in claim 2, wherein
the controller is adapted to set a saturation temperature of the substrate as an initial value of the temperature of the substrate, and
the estimator is adapted to estimate the saturation temperature depending on a number of cells of the second subset of cells.

8. The cell set SOC controlling system as claimed in claim 2, wherein
the controller is configured to select the second subset of cells with a priority to a cell SOC to be smaller in variation to a lowest cell SOC in the set of cells.

9. A cell set SOC controlling system comprising:
controlling means for individually controlling cell SOCs of a first subset of a set of cells in a heat dissipating manner, the first subset including cells other than a target cell, wherein a voltage of the target cell is set as a target voltage to control cell SOCs thereof as one subset ;
estimating means for estimating a degree of heat dissipation of the set of cells; and
interrupting means for interrupting controlling cell SOCs of a second subset of cells included in the first subset of cells after starting to charge the cells of the first subset and determined in dependence on the estimated degree of heat dissipation, cells of the second subset having a relatively small cell SOC variation with respect to the target cell.

10. A cell set SOC controlling method comprising:
individually controlling cell SOCs of a first subset of a set of cells in a heat dissipating manner, the first subset including cells other than a target cell, wherein a voltage of the target cell is set as a target voltage to control cell SOCs thereof as one subset;
estimating a degree of heat dissipation of the set of cells; and
interrupting controlling cell SOCs of a second subset of cells included in the first subset of cells after starting to charge the cells of the first subset and in dependence on the estimated degree of heat dissipation, cells of the second subset having a relatively small cell SOC variation with respect to the target cell.

11. The cell set SOC controlling system as claimed in claim 1, wherein the set of cells is included in a single battery.

12. The cell set SOC controlling system as claimed in claim 9, wherein the set of cells is included in a single battery.

13. The cell set SOC controlling method as claimed in claim 10, wherein the set of cells is included in a single battery.

14. The cell set SOC controlling system as claimed in claim 1, wherein the set of cells is included in a single battery, and wherein the set of cells comprise a set of serially connected simplex cells.

15. The cell set SOC controlling system as claimed in claim 9, wherein the set of cells is included in a single battery, and wherein the set of cells comprise a set of serially connected simplex cells.

16. The cell set SOC controlling method as claimed in claim 10, wherein the set of cells is included in a single battery, and wherein the set of cells comprise a set of serially connected simplex cells.

17. The cell set SOC controlling system as claimed in claim 1, wherein the system is adapted to determine a lowest voltage of a cell, and set that cell as the target cell, the voltage of the target cell being the target voltage.

18. The cell set SOC controlling system as claimed in claim 9, wherein the system is adapted to determine a lowest voltage of a cell, and set that cell as the target cell, the voltage of the target cell being the target voltage.

19. The cell set SOC controlling method as claimed in claim 10, wherein the method includes determining a lowest voltage of a cell, and setting that cell as the target cell, the voltage of the target cell being the target voltage.

20. A cell set SOC controlling system comprising:
a setting device configured to set a target voltage;
a controller configured to individually control cell SOCs of a first subset of a set of cells in a heat dissipating manner, the first subset including cells other than a target cell, wherein a voltage of the target cell is set as the target voltage to control cell SOCs thereof as one subset;
an estimator configured to estimate a degree of heat dissipation of the set of cells; and
an interrupter configured to interrupt controlling cell SOCs of a subset of cells included in the cells, whose voltages exceed the target voltage, after starting to charge the cells, whose voltages exceed the target voltage, and determined in dependence on the estimated degree of heat dissipation, cells of a second subset having a relatively small cell SOC variation with respect to the target cell.

21. The cell set capacity controlling system as claimed in claim 20, wherein
the controller comprises a set of control elements configured to control cell SOCs of the cells, and a substrate configured to be furnished with the set of control elements,
the estimator is configured to estimate the degree of heat dissipation in terms of a rise of a temperature of the substrate, and
the interrupter is adapted, in the event of the rise of the temperature exceeding a threshold therefor, to interrupt controlling cell SOCs of the subset of cells.

22. A cell set SOC controlling system comprising:
setting means for setting a target voltage;
controlling means for individually controlling cell SOCs of a first subset of a set of cells in a heat dissipating manner, the first subset including cells other than a target cell, wherein a voltage of the target cell is set as the target voltage to control cell SOCs thereof as one subset; estimating means for estimating a degree of heat dissipation of the set of cells; and
interrupting means for interrupting controlling cell SOCs of a subset of cells included in the cells, whose voltages exceed the target voltage, after starting to charge the cells, whose voltages exceed the target voltage, and determined in dependence on the estimated degree of heat dissipation, cells of a second subset having a relatively small cell SOC variation with respect to the target cell.

23. The cell set capacity controlling system as claimed in claim 22, wherein the controlling means comprises a set of control elements configured to control cell SOCs of the cells, and a substrate configured to be furnished with the set of control elements, the estimating means estimates the degree of heat dissipation in terms of a rise of a temperature of the substrate, and the interrupting means, in the event of the rise of the temperature exceeding a threshold therefor, interrupts controlling cell SOCs of the subset of cells.

24. A cell set SOC controlling method comprising:

setting a target voltage;

individually controlling cell SOCs of a first subset of a set of cells in a heat dissipating manner, the first subset including cells other than a target cell, wherein a voltage of the target cell is set as the target voltage to control cell SOCs thereof as one subset;

estimating a degree of heat dissipation of the set of cells; and interrupting controlling cell SOCs of a subset of cells included in the cells, whose voltages exceed the target voltage, after starting to charge the cells, whose voltages exceed the target voltage, and determined in dependence on the estimated degree of heat dissipation, cells of a second subset having a relatively small cell SOC variation with respect to the target cell.

25. The cell set SOC controlling method as claimed in claim 24, wherein cell SOCs of the cells are controlled by a set of control elements furnished on a substrate, the degree of heat dissipation in terms of a rise of a temperature of the substrate is estimated, and in the event of the rise of the temperature exceeding a threshold therefor, controlling cell SOCs of the subset of cells is interrupted.

26. A cell set SOC controlling system comprising:

a controller configured to individually control cell SOCs of a first subset of a set of cells in a heat dissipating manner, the first subset including cells other than a target cell, wherein the voltage of the target cell is set as a lowest voltage to control cell SOCs thereof as one subset;

an estimator configured to estimate a degree of heat dissipation of the set of cells; and an interrupter configured to interrupt controlling cell SOCs of a second subset of cells included in the first subset of cells during controlling of the cell SOCs of the first subset and determined in dependence on the estimated degree of heat dissipation, cells of the second subset having a relatively small cell SOC variation with respect to the target cell.

27. The cell set SOC controlling system according to claim 26, wherein the interrupter is configured to interrupt controlling cell SOCs of the second subset of cells included in the first subset of cells after starting to charge the cells of the first subset.

* * * * *